United States Patent
Koga

(10) Patent No.: US 11,172,136 B2
(45) Date of Patent: Nov. 9, 2021

(54) IMAGE CAPTURING APPARATUS, CONTROL APPARATUS, STORAGE MEDIUM, AND CONTROL METHOD

(71) Applicant: CANON KABUSHIKI KAISHA, Tokyo (JP)

(72) Inventor: Kazuhiro Koga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/995,570

(22) Filed: Aug. 17, 2020

(65) Prior Publication Data
US 2021/0058557 A1 Feb. 25, 2021

(30) Foreign Application Priority Data

Aug. 21, 2019 (JP) .............................. JP2019-151403

(51) Int. Cl.
*H04N 5/232* (2006.01)
*H04N 5/222* (2006.01)

(52) U.S. Cl.
CPC ....... *H04N 5/23299* (2018.08); *H04N 5/2228* (2013.01); *H04N 5/23203* (2013.01); *H04N 5/23216* (2013.01)

(58) Field of Classification Search
CPC ............. H04N 5/23299; H04N 5/2228; H04N 5/23203; H04N 5/23216
USPC .................................................. 348/211.99
See application file for complete search history.

(56) References Cited

U.S. PATENT DOCUMENTS

| | | | | |
|---|---|---|---|---|
| 5,148,201 A * | 9/1992 | Umetsu | ................... | G02B 7/102 396/135 |
| 6,526,232 B1 * | 2/2003 | Mizumura | ......... | H04N 5/23206 396/72 |
| 7,546,033 B2 * | 6/2009 | Kawada | ................. | H04N 5/232 396/301 |
| 8,289,442 B2 * | 10/2012 | Hirai | ...................... | G02B 7/102 348/372 |
| 8,477,236 B2 * | 7/2013 | Kasuya | ................... | G03B 17/00 348/372 |
| 8,711,490 B2 * | 4/2014 | Kasuya | ................... | G02B 7/102 359/698 |
| 9,966,730 B2 * | 5/2018 | Adachi | ............... | H01S 5/02253 |
| 10,348,973 B2 * | 7/2019 | Irie | ..................... | G06K 9/00744 |
| 10,523,871 B2 * | 12/2019 | Hayashi | ............. | H04N 5/23218 |
| 10,659,691 B2 * | 5/2020 | Wakamatsu | ....... | H04N 5/23287 |

(Continued)

FOREIGN PATENT DOCUMENTS

JP      2010114521 A      5/2010

*Primary Examiner* — Pritham D Prabhakher
(74) *Attorney, Agent, or Firm* — Canon U.S.A., Inc. IP Division

(57) ABSTRACT

An image capturing apparatus includes an image capturing unit configured to capture an image of an object, a driving unit configured to change an image capturing direction of the image capturing unit, a control unit configured to control the driving unit, and, a reception unit configured to receive first tally information from another apparatus, wherein the control unit is configured to control, in a case where the reception unit does not receive the first tally information, the driving unit to set a maximum speed of the driving unit at a first driving speed, and control, in a case where the reception unit receives the first tally information, the driving unit to set the maximum speed at a second driving speed lower than the first driving speed.

22 Claims, 16 Drawing Sheets

(56) References Cited

U.S. PATENT DOCUMENTS

| | | | |
|---|---|---|---|
| 2010/0231778 A1* | 9/2010 | Hirai | G02B 7/102 |
| | | | 348/335 |
| 2012/0154927 A1* | 6/2012 | Kasuya | G02B 7/102 |
| | | | 359/698 |
| 2016/0173755 A1* | 6/2016 | Hashiguchi | H04N 5/23296 |
| | | | 348/211.3 |
| 2017/0163881 A1* | 6/2017 | Oshima | H04N 7/183 |
| 2017/0163899 A1* | 6/2017 | Irie | H04N 5/23219 |
| 2017/0195577 A1* | 7/2017 | Mitani | H04N 5/23203 |
| 2018/0234635 A1* | 8/2018 | Hayashi | H04N 5/23219 |
| 2019/0313058 A1* | 10/2019 | Harrison | G06K 9/32 |

* cited by examiner

FIG.4

| Default maximum speed | Program maximum speed | Control maximum speed |
|---|---|---|
| unlimited | 15 | unlimited |

IMAGE CAPTURING APPARATUS, CONTROL APPARATUS, STORAGE MEDIUM, AND CONTROL METHOD

BACKGROUND

Field of the Disclosure

The present disclosure relates to an image capturing apparatus and an image capturing system capable of pan and tilt driving, and more particularly to speed control during pan and tilt driving.

Description of the Related Art

Pan-tilt cameras including an image capturing unit capable of being remotely driven in pan and tilt directions have been used at the scenes of video production in recent years. For image capturing, an external control apparatus called a controller is connected to a pan-tilt camera via a cable. A stick on the controller is operated to remotely pan and tilt the pan-tilt camera to change the imaging direction of the pan-tilt camera in capturing an image of an object. In a case where a pan speed or tilt speed of the pan-tilt camera is too high during distribution or recording, the image become blurred and a video image is not viewable. An upper limit control on the pan and tilt speeds of the pan-tilt camera may therefore be desirable.

For example, Japanese Patent Application Laid-Open No. 2010-114521 discusses a technique for remotely controlling pan-tilt cameras using a controller having volume control knobs for adjusting maximum speeds, and limiting the driving speeds of pan and tilt operations to predetermined ranges by knob operations.

However, the technique discussed in Japanese Patent Application Laid-Open No. 2010-114521 does not take into account whether the video image output by the pan-tilt camera to be operated is currently put on a program by video switching of a switcher. Thus, there is an issue of manually changing the maximum speeds each time switching is performed.

SUMMARY

The present disclosure is directed to providing an image capturing apparatus that determines whether a video image output from a camera to be operated is being put on a program by an external control apparatus, and controls pan and tilt maximum speeds.

According to an aspect of the present disclosure, an image capturing apparatus includes an image capturing unit configured to capture an image of an object, a driving unit configured to change an image capturing direction of the image capturing unit, a control unit configured to control the driving unit, and, a reception unit configured to receive first tally information from another apparatus, wherein the control unit is configured to control, in a case where the reception unit does not receive the first tally information, the driving unit to set a maximum speed of the driving unit at a first driving speed, and control, in a case where the reception unit receives the first tally information, the driving unit to set the maximum speed at a second driving speed lower than the first driving speed.

Further features of the present disclosure will become apparent from the following description of exemplary embodiments with reference to the attached drawings.

BRIEF DESCRIPTION OF THE DRAWINGS

FIG. 4 is a diagram illustrating an example of a maximum speed management table storing maximum speed management information according to one or more embodiment of the subject disclosure.

DESCRIPTION OF THE EMBODIMENTS

Exemplary embodiments of the present disclosure will be described below with reference to the accompanying drawings. The configurations described in the following exemplary embodiments are just examples, and the present disclosure is not limited thereto.

A first exemplary embodiment of the present disclosure will be described below with reference to FIGS. 1 to 7.

Figure 1:
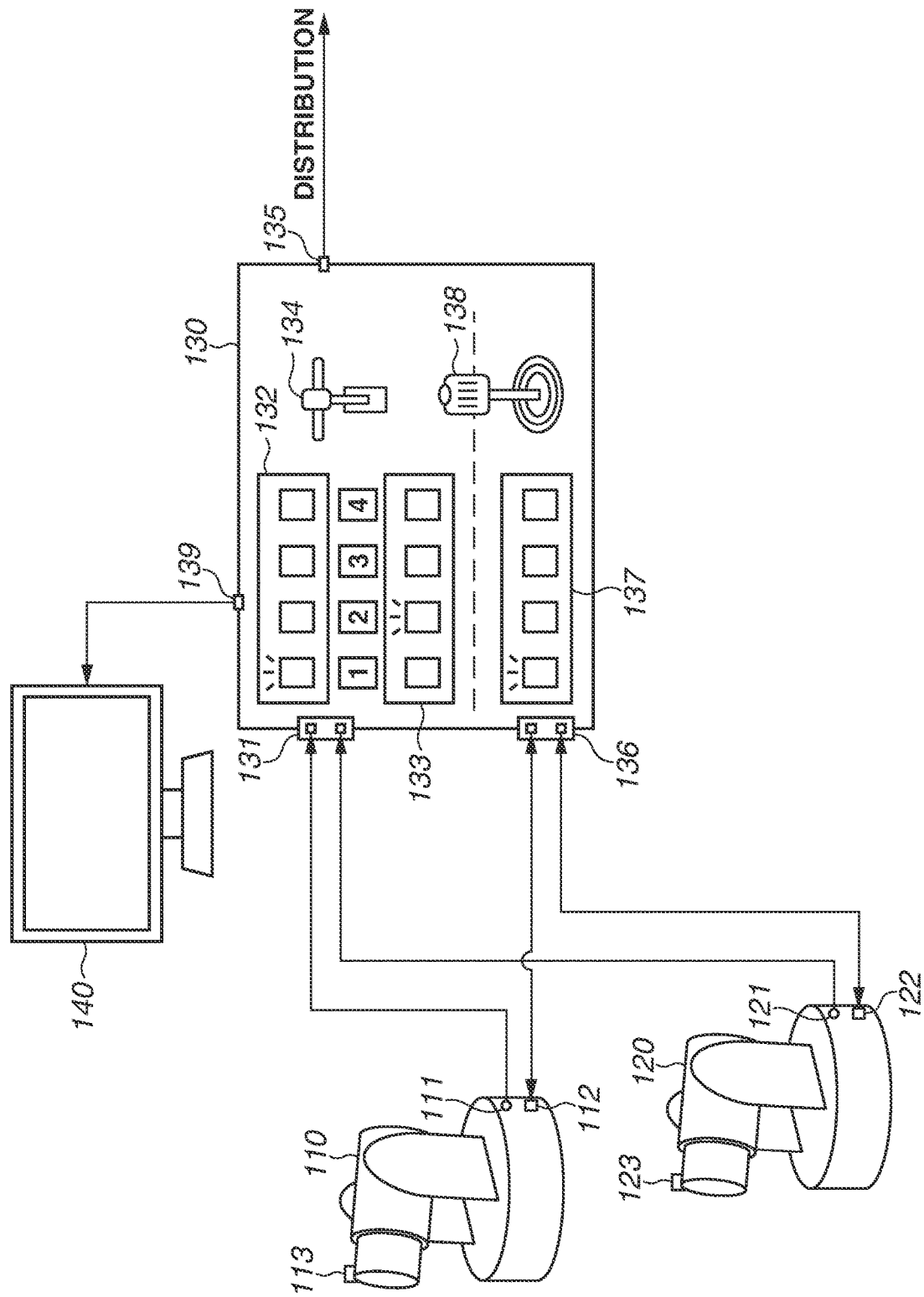
FIG. 1 is a configuration diagram of a camera control system where cameras participate according to one or more embodiment of the subject disclosure.

FIG. 1 illustrates a configuration diagram of a camera control system where cameras according to the present exemplary embodiment participate. The camera control system illustrated in FIG. 1 includes a camera 110, a camera 120, a camera controller 130 having a switcher function, and a monitor 140.

The camera 110 includes a video output terminal 111, a control communication terminal 112, and a tally lamp 113. The camera 120 similarly includes a video output terminal 121, a control communication terminal 122, and a tally lamp 123.

The video output terminals 111 and 121 are terminals for outputting video images captured by the own cameras 110 and 120, respectively. Examples of the video output terminals 111 and 121 include ones compliant with standards such as Serial Digital Interface (SDI) and High-Definition Multimedia Interface (HDMI)(registered trademark). The video images may be packetized by using the Internet Protocol (IP), and the resulting packets may be output as video outputs from Ethernet (registered trademark) terminals.

The control communication terminals 112 and 122 are communication terminals (reception units) for receiving and responding to control signals and control commands (first tally information) from the camera controller 130 having the switcher function. Examples of the control communication terminals 112 and 122 include a contact terminal that simply transmits a high/low signal, and terminals compliant with a serial communication standard such as Recommended Standard (RS)-232C and a communication standard such as the Ethernet (registered trademark).

The tally lamps 113 and 123 (display units) are turned on when the video images output from the own cameras 110 and 120 are live-distributed (or recorded) by the camera controller 130 having the switcher function (such a state will hereinafter be referred to as "on-program"). This enables a person to be imaged (object) to recognize which camera is on distribution/recording. The tally lamps 113 and 123 may be lit in red during video distribution/recording. The tally lamps 113 and 123 may be configured as two-color tally lamps that are lit in red during video distribution/recording and in green during a preview (candidate camera to be used for distribution/recording the next time the switcher switches). In the case of the camera 110, the actual on/off control of the tally lamp 113 is performed such that when the control communication terminal 112 receives an on/off control signal or control command (first tally information), the tally lamp 113 is turned on/off based on a control instruction included in the control signal or command.

The camera controller 130 having the switcher function includes, as a switcher unit, the following components: video input terminals 131, program selection buttons 132, preview selection buttons 133, a switch lever 134, and a video output terminal 135. The camera controller 130 also includes, as a camera control unit, the following components: control communication terminals 136, control camera selection buttons 137, and a stick 138. The camera controller 130 further includes a monitor output unit 139. In the present exemplary embodiment, the camera controller 130 having the switcher function (video switcher function) is described, by way of example, as an apparatus having both the switcher function and a camera control function. However, a switcher apparatus and a control apparatus may be separately provided.

The video input terminals 131 are terminals for inputting video images output from cameras. To input video images from a plurality of cameras, the camera controller 130 includes a plurality of video input terminals 131. In the example of FIG. 1, the video images output from the video output terminals 111 and 121 of the cameras 110 and 120 are input to respective video input terminals 131.

The program selection buttons 132 are buttons for selecting the video image of which camera to output to the video output terminal 135 among the video images of the cameras input via the video input terminals 131. The video image output from the video output terminal 135 of the switcher unit will be referred to as a program video image.

The camera controller 130 includes a plurality of program selection buttons 132, and the video image of the camera corresponding to a selected number is output from the video output terminal 135 as a program video image. In the example of FIG. 1, the camera controller 130 includes four program selection buttons from Nos. 1 to 4, and the video images of up to four cameras can be input for selection. When an operator presses and selects a program selection button 132, the selected program selection button 132 is lit to allow the operator to identify the selected camera.

The preview selection buttons 133 are buttons for selecting the video image of which camera to use as a preview video image from among the video images of the cameras input via the video input terminals 131. A preview video image refers to a video image to be switched with the program video image when a switch operation is performed by the switch lever 134. A candidate video image to be switched next is selected as a preview video image by using the preview selection buttons 133 in advance. The camera controller 130 includes a plurality of preview selection buttons 133, and the video image of the camera corresponding to a selected number is selected as a preview video image. In the example of FIG. 1, like the program selection buttons 132, the camera controller 130 includes four preview selection buttons from Nos. 1 to 4, and the video images of up to four cameras can be input for selection. Like the program selection buttons 132, when the operator presses and selects a preview selection button 133, the selected preview selection button 133 is lit to allow the operator to identify the camera selected for a preview.

The switch lever 134 is a lever for switching a program video image with a preview video image. A description will be given by using a case where the video image of the camera 110 is assigned to the buttons No. 1 and the video image of the camera 120 is assigned to the buttons No. 2 as an example. Suppose that the program selection button 132 No. 1 (video image of the camera 110) is currently selected and lit as a program video image, and the preview selection button 133 No. 2 (video image of the camera 120) is selected and lit as a preview video image. When the switch lever 134 is operated and lowered in such a state, the video image having been the preview video image becomes a program video image, and the video image having been the program image becomes a preview video image. More specifically, when the switch lever 134 is lowered, the program selection button 132 No. 1 turns off and the program selection button 132 No. 2 turns on. The program video image is switched to the video image of the camera 120 and output to the video output terminal 135. At the same time, the preview selection button 133 No. 2 turns off and the preview selection button 133 No. 1 turns on, and the preview video image is switched to the video image of the camera 110.

The video output terminal 135 is a terminal for outputting the foregoing program video image. The video output terminal 135 outputs the program video image to a not-illustrated live distribution apparatus or a program recording apparatus.

The control communication terminals 136 are terminals for connecting to the control communication terminals 112 and 122 of the cameras 110 and 120 via cables. To control a plurality of cameras, the camera controller 130 includes a plurality of control communication terminals 136. The camera controller 130 performs communication intended for control instructions with the cameras 110 and 120 via the control communication terminals 136. Specifically, the camera controller 130 transmits control commands intended for driving control in pan and tilt operations of changing the image capturing direction of a camera, and a control command (first tally information) intended for tally control. The camera controller 130 also performs communication for receiving responses to such instructions from the cameras via the control communication terminals 136.

The control camera selection buttons 137 are buttons for selecting which camera to perform pan and tilt control on. The camera controller 130 includes four control camera selection buttons from Nos. 1 to 4, and can select which camera to control from up to four cameras. Like the program selection buttons 132, the control camera selection button 137 corresponding to the number of a selected camera is lit to allow the operator to identify the camera to be controlled.

The stick 138 (operation unit) is a stick for moving the camera to be controlled, which is selected by using the control camera selection buttons 137, in a pan direction and a tilt direction. For example, in a case where the operator presses the control camera selection button 137 No. 1 and then tilts the stick 138 to the left, the camera controller 130 transmits an instruction to pan to the left from the control communication terminal 136 to the selected camera 110, whereby the camera 110 is driven to pan. In the process, the camera controller 130 determines the pan speed based on the tilt angle of the stick 138, and instructs the camera 110 about the pan speed as well. The stick 138 can also be axially turned to transmit an instruction to zoom the camera. A clockwise turn instructs the camera to zoom in. A counterclockwise turn instructs the camera to zoom out.

The monitor output unit 139 generates a video image in which a plurality of video images input from the video input terminals 131 is arranged side by side, and outputs the generated video image to the monitor 140. The monitor output unit 139 also outputs a setting screen for settings of the cameras 110 and 120 and the camera controller 130 having the switcher function.

The monitor 140 is a monitor for displaying the video image, for monitor output purposes, output from the camera controller 130 having the switcher function. The monitor 140 also displays the foregoing setting screen.

Figure 2:
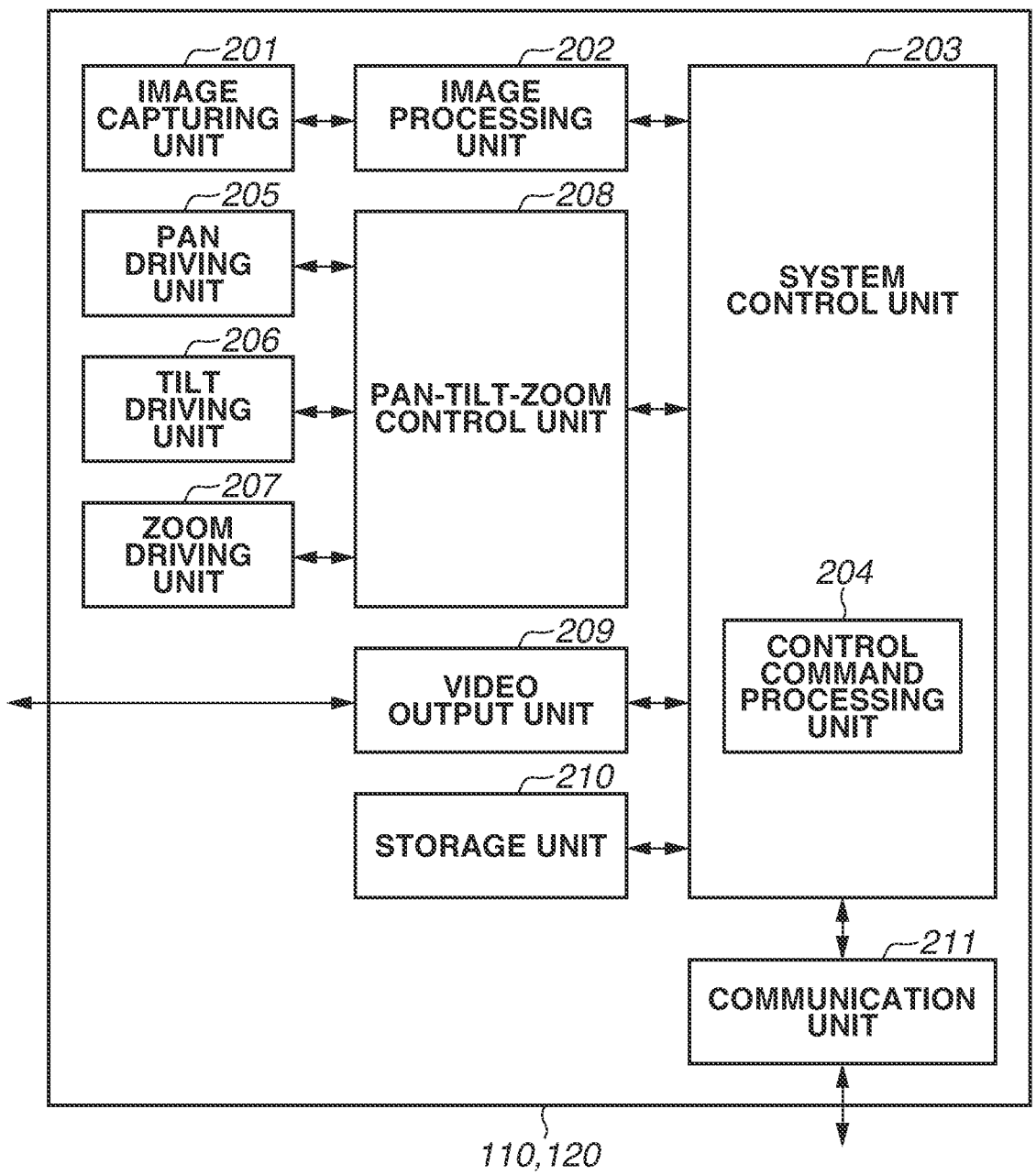
FIG. 2 is a functional configuration diagram of the cameras according to one or more embodiment of the subject disclosure.

FIG. 2 illustrates a functional block diagram of the cameras 110 and 120 according to the present exemplary embodiment. While the functional blocks of the camera 110 will be described as an example with reference to FIG. 2, the camera 120 includes similar functional blocks.

An image capturing unit 201 includes an imaging lens and an image sensor. The image capturing unit 201 generates image data by capturing an image of an object and converting the image into an electrical signal.

An image processing unit 202 performs image processing such as noise reduction and gamma correction on the electrical signal (image data) converted by the image capturing unit 201, and transmits the image data to a system control unit 203.

The system control unit 203 (control unit, determination unit) includes one or more processors such as a central processing unit (CPU) and a microprocessing unit (MPU). The system control unit 203 controls the entire camera 110 by executing a program stored in a storage unit 210 to be described below. The system control unit 203 also controls transmission of the generated image data to a video output unit 209. Moreover, the system control unit 203 instructs the image processing unit 202 about imaging parameters such as an image quality adjustment setting, and the image capturing unit 201 performs adjustment control based on the transmitted instructions. The system control unit 203 further performs processing for writing and storing setting values such as image quality adjustment parameters and video output settings, and settings about pan and tilt control, into a not-illustrated area of the storage unit 210. Upon restart, the system control unit 203 performs processing for reading the previously set values from the not-illustrated area of the storage unit 210 and performing activation.

The system control unit 203 further includes a control command processing unit 204 inside.

The control command processing unit 204 controls turning on and off of the tally lamp 113 based on a control command (first tally information) intended for tally control, received by a communication unit 211. The control command processing unit 204 issues instructions to a pan-tilt-zoom control unit 208 based on control commands intended for pan and tilt control, received by the communication unit 211.

A pan driving unit 205 includes a mechanical driving system (pan driving mechanism) for performing a pan operation, a motor serving as a driving source of the pan driving mechanism, and an angle sensor for detecting the angle of the pan driving mechanism. The pan driving mechanism is driven in a pan direction by the motor being driven.

A tilt driving unit 206 includes a mechanical driving system (tilt driving mechanism) for making a tilt operation, a motor serving as a driving source of the tilt driving mechanism, and an angle sensor for detecting the angle of the tilt driving mechanism. The tilt driving mechanism is driven in a tilt direction by the motor being driven.

The zoom driving unit 207 includes a driving unit and a motor for a zoom lens, and a sensor for detecting the position of the zoom lens. The zoom lens is moved in an optical axis direction to change a focal length by the motor being driven.

The pan-tilt-zoom control unit 208 controls the pan driving unit 205, the tilt driving unit 206, and the zoom driving unit 207 based on instruction signals transmitted from the system control unit 203.

The video output unit 209 outputs a video image converted into a predetermined video format to the video output terminal 111.

The storage unit 210 stores the program and setting values to be used by the system control unit 203, and is read and written by the system control unit 203. Storing the setting values in the storage unit 210 enables restart using the previously set values.

The communication unit 211 communicates with devices such as an external control apparatus, and performs communication processing for transmitting communication data received by the control communication terminal 112 to the system control unit 203 and transmitting communication data instructed by the system control unit 203 from the control communication terminal 112.

Figure 3:
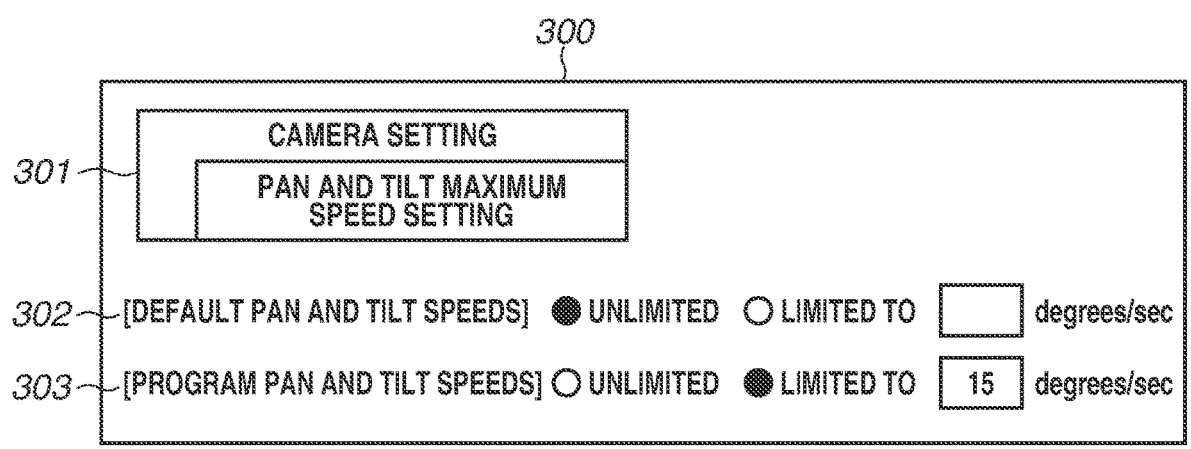
FIG. 3 is a diagram illustrating an example of a setting screen for setting pan and tilt maximum speeds into a camera according to one or more embodiment of the subject disclosure.

FIG. 3 illustrates an example of a setting screen for setting pan and tilt maximum speeds of a camera according to the present exemplary embodiment. This setting screen is output from the monitor output unit 139 based on information about the setting screen which is received by the camera controller 130 having the switcher function from the camera 110 as a response to an acquisition request for the setting screen transmitted from the camera controller 130 to the camera 110. While FIG. 3 is described by using the camera 110 as an example, the camera 120 has a similar setting screen.

A pan and tilt maximum speed setting screen 300 includes a setting title section 301 and setting items, namely, a default pan and tilt speed setting 302 and a program pan and tilt speed setting 303.

The setting title section 301 displays a title character string indicating pan and tilt maximum speed setting.

The default pan and tilt speed setting 302 includes radio buttons for selecting whether to limit the pan and tilt speeds during normal operations other than on-program. The default pan and tilt speed setting 302 also includes a text box for inputting a maximum speed in the case of limiting the pan and tilt speeds.

The program pan and tilt speed setting 303 includes radio buttons for selecting whether to limit the pan and tilt speed when on-program. The program pan and tilt speed setting 303 also includes a text box for inputting a maximum speed in the case of limiting the pan and tilt speeds. Setting operations are performed using a not-illustrated keyboard connected to the camera controller 130 having the switcher function.

When the user performs a setting change on the setting screen, the camera controller 130 having the switcher function transmits the content of the setting change to the camera 110. The camera 110 reflects the received content of the setting change on a maximum speed management table.

FIG. 4 illustrates an example of the maximum speed management table storing maximum speed management information according to the present exemplary embodiment.

The maximum speed management table 400 includes the following fields: a default maximum speed 401, a program maximum speed 402, and a control maximum speed 403. The maximum speed management table 400 is stored in a not-illustrated area of the storage unit 210.

The default maximum speed 401 stores the setting value of the default pan and tilt speed setting 302 described above with reference to FIG. 3. The default maximum speed 401 stores "unlimited" in a case where the default pan and tilt speed setting 302 is set to unlimited, and stores the numerical value of the maximum speed in a case where the default pan and tilt speed setting 302 is limited.

The program maximum speed 402 stores the setting value of the program pan and tilt speed setting 303 described above with reference to FIG. 3. The program maximum speed 402 stores "unlimited" in a case where the program pan and tilt speed setting 303 is set to unlimited, and stores the numerical value of the maximum speed in a case where the program pan and tilt speed setting 303 is limited.

The control maximum speed 403 stores the setting value of the maximum speed to be referred to during actual pan and tilt driving. The setting value is changed depending on a change in a video distribution state (tally state). A method for changing the setting value will be described below.

Figure 5:
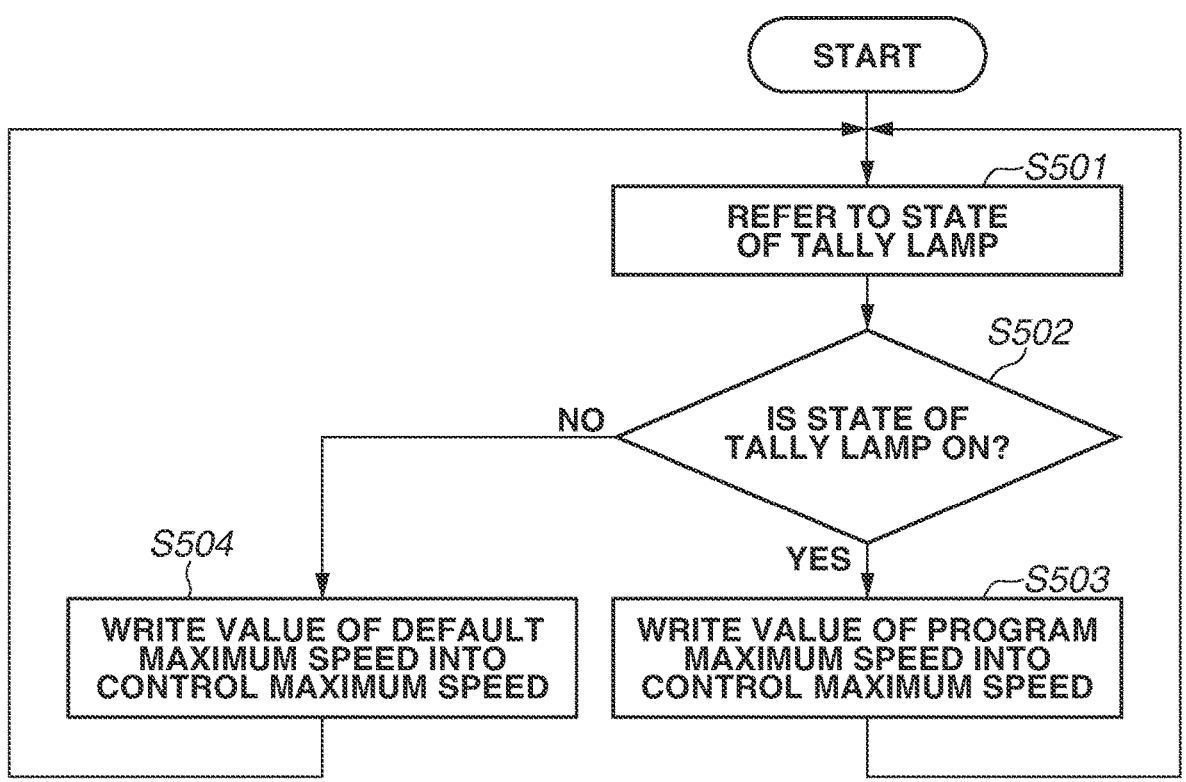
FIG. 5 is a flowchart illustrating a processing procedure for changing the setting value of a maximum speed to be referred to during pan and tilt driving based on a change in a tally state according to one or more embodiment of the subject disclosure.

FIG. 5 is a flowchart illustrating a processing procedure for changing the setting value of the maximum speed to be referred to during pan and tilt driving based on a change in the video distribution state (tally state).

The processing of the flowchart is performed by the system control unit 203 of the camera 110 or 120.

In step S501, the system control unit 203 refers to (determines) the state of the tally lamp to find out the video distribution state. To determine the on/off state of the tally lamp, the system control unit 203 refers to a value in a control register of a not-illustrated lamp-on output port of the system control unit 203. In a case where the communication unit 211 receives a control command (first tally information) indicating that the camera is on-program (video distribution is in progress) from the camera controller 130, the system control unit 203 writes 1 into the corresponding bit of the control register of the lamp-on output port. In a case where the communication unit 211 receives a control command indicating that the camera is not on-program from the camera controller 130, the system control unit 203 writes 0 into the corresponding bit of the control register of the lamp-on output port. When 1 is written in the corresponding bit of the control register, the voltage of the lamp-on output port is set to high and the tally lamp turns on (on-program). When 0 is written in the corresponding bit of the control register, the voltage of the lamp-on output port is set to low and the tally lamp turns off (default). The system control unit 203 can thus determine whether the tally lamp is in an on state (on-program) or an off state (default) by referring to the value in the control register of the lamp-on output port.

In step S502, the system control unit 203 checks whether the state of the tally lamp referred to is on. In a case where the state of the tally lamp is on (YES in step S502), the processing proceeds to step S503. In step S503, the system control unit 203 writes the value of the program maximum speed into the control maximum speed. Specifically, the system control unit 203 reads the value of the program maximum speed 402 described above with reference to FIG. 4 and writes the value into the control maximum speed 403. Meanwhile, in a case where the state of the tally lamp is off (NO in step S502), the processing proceeds to step S504. In step S504, the system control unit 203 writes the value of the default maximum speed into the control maximum speed. Specifically, the system control unit 203 reads the value of the default maximum speed 401 described above with reference to FIG. 4 and writes the value into the control maximum speed 403.

In such a manner, the system control unit 203 can determine whether the video image of the own camera is currently being distributed (on-program) by checking the state of the tally lamp, and change the pan and tilt maximum speeds between when on-program and when not. Alternatively, instead of checking the state of the tally lamp, the system control unit 203 may determine whether the video image of the own camera is currently being distributed (video distribution state) based on the control command intended for tally control (first tally information) received by the communication unit 211. This enables the speed control on the pan and tilt driving based on the video distribution state even in a case where the camera does not include a tally lamp.

Figure 6:
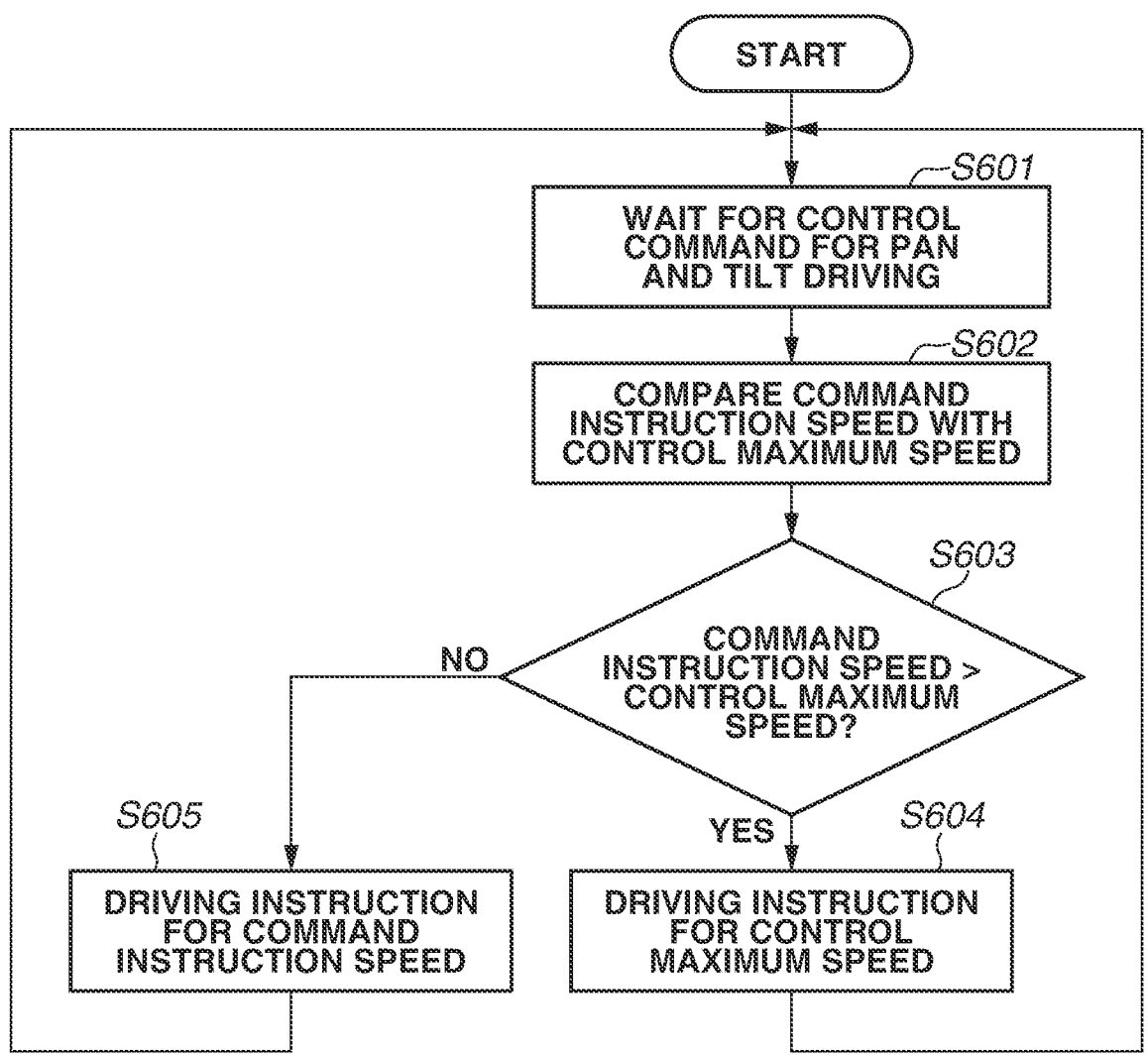
FIG. 6 is a flowchart illustrating a processing procedure for performing pan and tilt driving control by using the value of a control maximum speed according to one or more embodiment of the subject disclosure.

FIG. 6 is a flowchart illustrating a processing procedure for performing pan and tilt driving control by using the value of the control maximum speed.

The processing of this flowchart is performed by the control command processing unit 204 in the system control unit 203 of the camera 110 or 120.

In step S601, the control command processing unit 204 waits for a control command for pan and tilt driving. In a case where the communication unit 211 receives a control command transmitted from the camera controller 130 having the switcher function, the control command is transmitted to the control command processing unit 204. The control command processing unit 204 waits for that command.

When a control command for pan and tilt driving is transmitted, then in step S602, the control command processing unit 204 compares an instruction speed (command instruction speed) described in the transmitted control command with the control maximum speed. In step S603, the control command processing unit 204 checks whether the command instruction speed is higher. In a case where the command instruction speed is higher than the control maximum speed (YES in step S603) the processing proceeds to step S604. In step S604, the control command processing unit 204 issues a driving instruction for the control maximum speed to the pan-tilt-zoom control unit 208. The processing returns to step S601, and the control command processing unit 204 waits for a control command. Meanwhile, in a case where the command instruction speed is lower than or equal to the control maximum speed (NO in step S603), the processing proceeds to step S605. In step S605, the control command processing unit 204 issues a driving instruction for the instruction speed specified by the control command to the pan-tilt-zoom control unit 208. Then, the processing returns to step S601, and the control command processing unit 204 waits for a control command.

A description will be given by using specific values. Suppose, for example, that the instruction content of the received control command is a pan speed of 40 degrees/sec, and the control maximum speed is 15 degrees/sec. Since the pan speed exceeds the value of the control maximum speed, the processing of step S604 is not performed. In other words, the control command processing unit 204 issues a control instruction for driving at a pan speed of 15 degrees/sec to the pan-tilt-zoom control unit 208.

In the above-described manner, the pan and tilt driving control can be performed within the pan or tilt speeds not exceeding the control maximum speed that varies in value depending on whether the video image of the own camera is currently being distributed.

Figure 7:
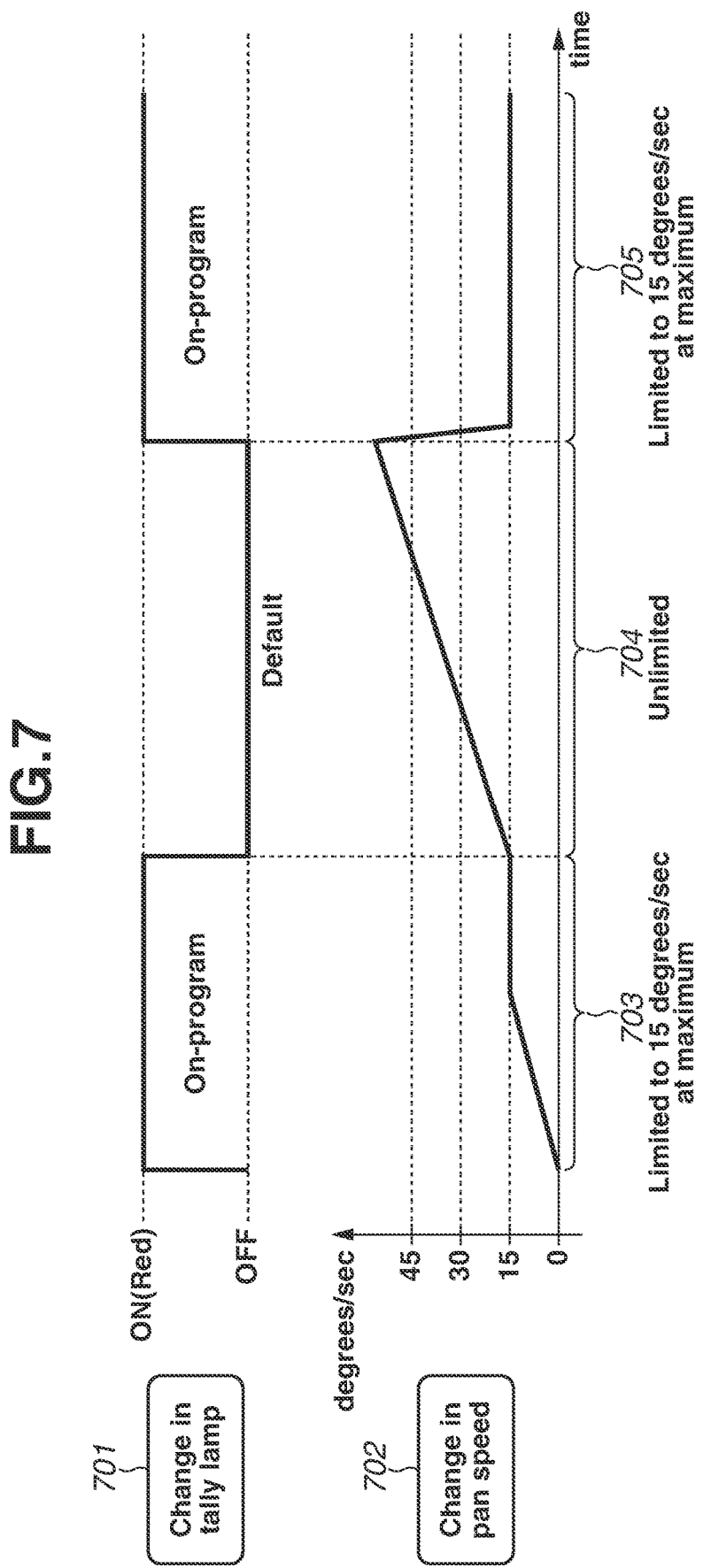
FIG. 7 is a time series graph illustrating a pan driving speed in a case where the control maximum speed changes due to a change in the tally state according to one or more embodiment of the subject disclosure.

FIG. 7 is a time series graph illustrating a pan driving speed in a case where the control maximum speed changes due to a change in the tally state (video distribution state) according to the present exemplary embodiment. This time series graph is an example of when the program maximum speed has a value of 15 degrees/sec and the default maximum speed is unlimited.

The time series graph of FIG. 7 includes two time series graphs, namely, one for a change in the tally lamp 701 and one for a change in the pan speed 702. Intervals 703, 704, and 705 will be separately described.

In the interval 703, the tally lamp is on. In a case where a pan operation is performed in the interval 703, the pan speed increases only up to a speed of 15 degrees/sec since the program mx speed is applied to the control maximum speed. When the switcher unit of the camera controller 130 having the switcher function then switches and the video distribution state of the camera is no longer on-program, the tally lamp turns off and the interval 704 starts. In the interval 704, the default maximum speed is applied to the control maximum speed. With the speed limitation lifted, the pan speed increases based on the control command. When the switcher unit of the camera controller 130 having the switcher function then switches and the video distribution state of the camera is on-program again, the tally lamp turns on again and the interval 705 starts. In the interval 705, the program maximum speed is applied to the control maximum speed, and the pan speed above 45 degrees/sec decreases to 15 degrees/sec.

As can be seen from the time series graph, by the control according to the present exemplary embodiment having been described, the cameras 110 and 120 can be moved to pan and tilt with an upper limit applied to the pan and tilt speeds when the video distribution state of the cameras 110 and 120 is on-program. The cameras 110 and 120 can be moved to pan and tilt at high speed without an upper limit when other than on-program.

A second exemplary embodiment will be described below with reference to FIGS. 8 to 11.

In the second exemplary embodiment, speed limitation control to be performed during a preview as well as when on-program will be described. Similar components to those of the first exemplary embodiment are denoted by the reference numerals used above, and a redundant detailed description thereof will be omitted. Differences from the first exemplary embodiment, or more specifically, the setting and control of a preview maximum speed will be mainly described. Such omission of redundant description applies to the following other exemplary embodiments.

In the first exemplary embodiment, whether the video image of the own camera is currently being distributed is determined by checking the state of the tally lamp, and the pan and tilt maximum speeds are controlled differently between when on-program (during video distribution) and when not. In the present exemplary embodiment, a maximum speed during a preview is also set, and therefore the pan and tilt maximum speeds can be controlled differently when on-program, during a preview, and at default time.

Figure 8:
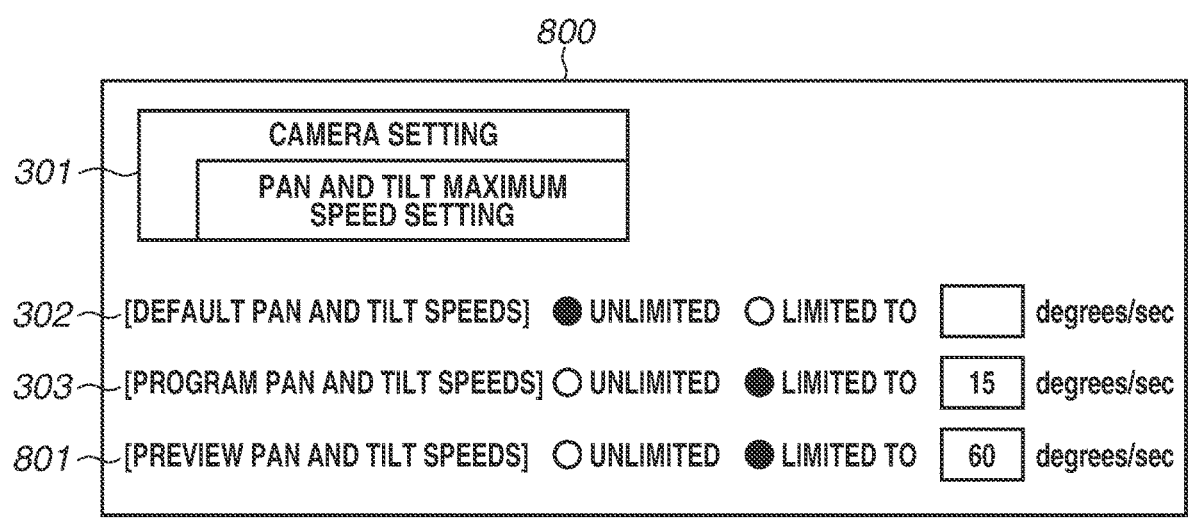
FIG. 8 is a diagram illustrating an example of a setting screen, where a preview pan and tilt speed setting is added to the setting items for setting the pan and tilt maximum speeds according to one or more embodiment of the subject disclosure.

FIG. 8 illustrates an example of a setting screen according to the present exemplary embodiment, where a preview pan and tilt speed setting is added to the items for setting the pan and tilt maximum speeds.

A pan and tilt maximum speed setting screen 800 includes the setting title section 301 and the following setting items: the default pan and tilt speed setting 302, the program pan and tilt speed setting 303, and a preview pan and tilt speed setting 801 that is the additional item.

The preview pan and tilt speed setting 801 added in the present exemplary embodiment includes radio buttons for selecting whether to limit the pan and tilt speed during preview. The preview pan and tilt speed setting 801 further includes a text box for inputting a maximum speed in the case of limiting the pan and tilt speeds during a preview.

The addition of this item enables imposition of another speed limitation when the video image of the own camera is under previewed other than on-program and at default time (when the video image is not on-program or being previewed).

Figure 9:
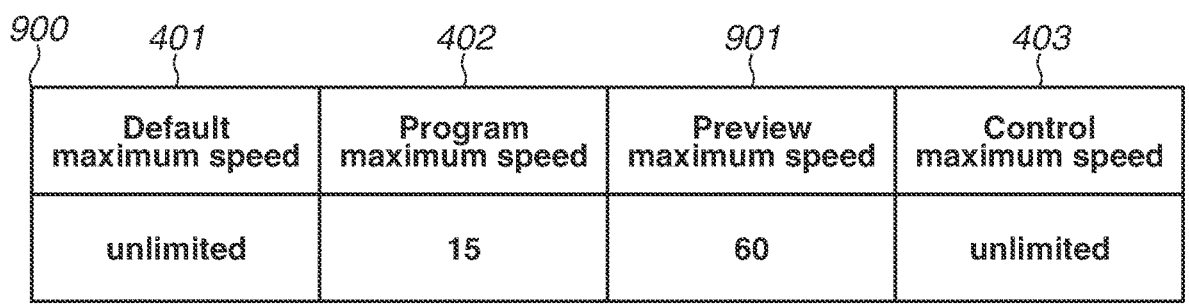
FIG. 9 is a diagram illustrating an example of a maximum speed management table storing maximum speed management information where a preview maximum speed is added according to one or more embodiment of the subject disclosure.

FIG. 9 illustrates an example of a maximum speed management table storing maximum speed management information according to the present exemplary embodiment, where the preview maximum speed is added.

Figure 10:
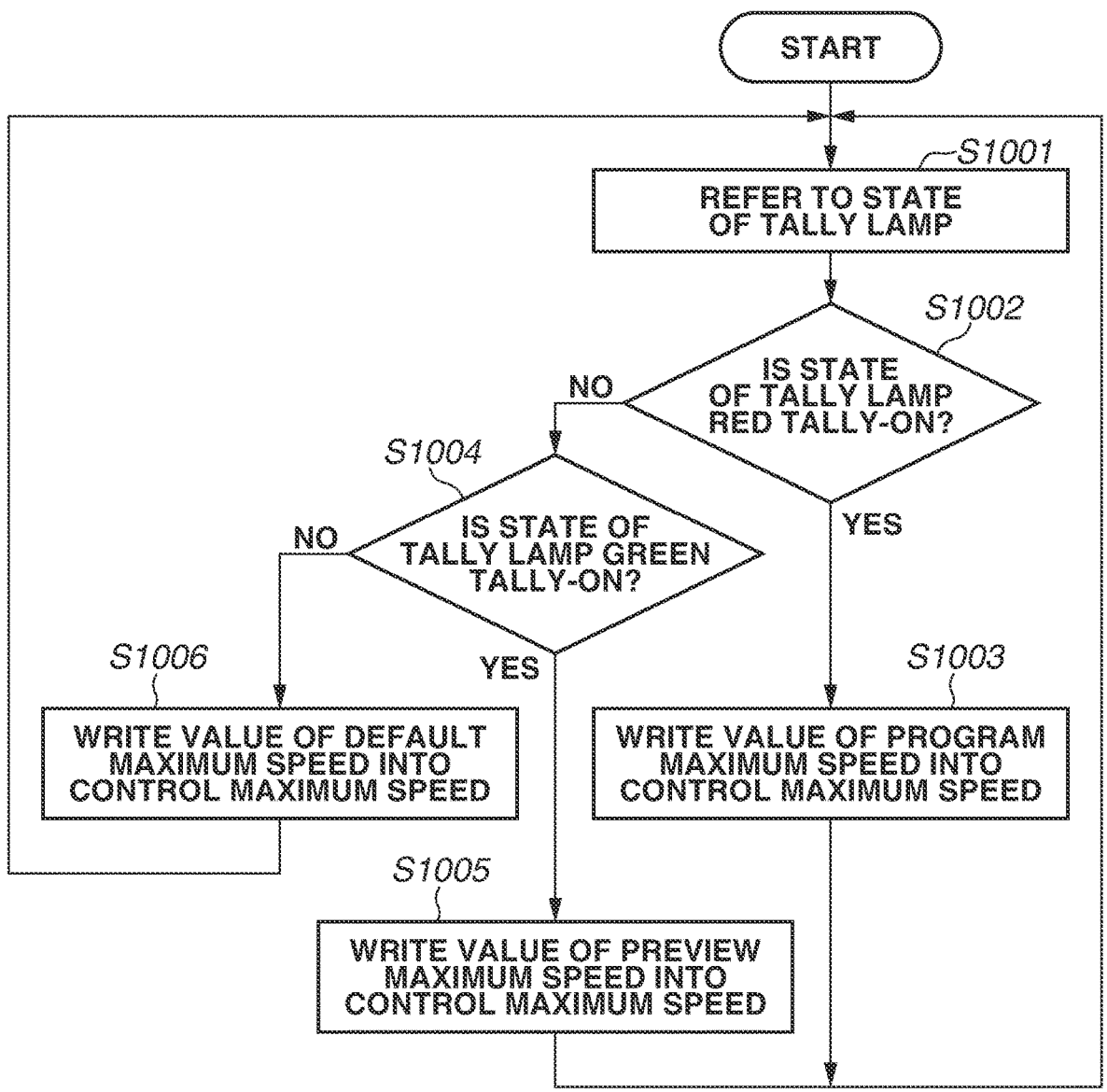
FIG. 10 is a flowchart illustrating a processing procedure for changing the setting value of the control maximum speed where a preview state is added to possible changes in the tally state according to one or more embodiment of the subject disclosure.

FIG. 10 is a flowchart illustrating a processing procedure for changing the setting value of the maximum speed in the case where a preview state is added to the possible changes in the video distribution state.

In step S1001, the system control unit 203 refers to the state of the tally lamp to find out a video distribution/ recording state (tally state). In the present exemplary embodiment, the system control unit 203 checks not only whether the tally lamp is on but the light color of the tally lamp as well. The system control unit 203 refers to a value in a control register of a not-illustrated color specification port of the system control unit 203 in addition to the value in the control register of the not-illustrated lamp-on output port. Specifically, in a case where the communication unit 211 receives the first tally information (program) or second tally information (preview) as a control command, the system control unit 203 writes 1 into the corresponding bit of the control register of the lamp-on output port. In a case where the communication unit 211 receives a control command indicating neither on-program nor a preview from the camera controller 130, the system control unit 203 writes 0 into the corresponding bit of the control register of the lamp-on output port. When 1 is written in the corresponding bit of the control resistor, the voltage of the lamp-on output port is set to high and the tally lamp turns on (on-program or during a preview). When 0 is written in the corresponding bit, the voltage is set to low and the tally lamp turns off (default). Whether the tally lamp is in an on state (on-program or during a preview) or an off state (default) can thus be determined by referring to the value in the control register of the lamp-on output port. Moreover, in a case where the communication unit 211 receives a control command (first tally information) indicating on-program (that the video distribution is in progress) from the camera controller 130, the system control unit 203 writes 1 into the corresponding bit of the control register of the color specification port. In a case where the communication unit 211 receives a control command (second tally information) indicating a preview from the camera controller 130, the system control unit 203 writes 0 into the corresponding bit of the control register of the color specification port. The tally lamp includes a circuit that turns on a red lamp when 1 is written in the corresponding bit of the control register of the color specification port, and turns on a green lamp when 0 is written. The system control unit 203 can thus perform a determination taking into account the color as well by referring to the value in the control register of the color specification port as well as the value in the control register of the lamp-on output port.

In step S1002, the system control unit 203 checks whether the state of the tally lamp referred to is on and red tally (red lamp is lit; hereinafter, such a state will be referred to as red tally-on). In a case where the state of the tally lamp is red tally-on (YES in step S1002), the processing proceeds to step S1003. In step S1003, the system control unit 203 writes the value of the program maximum speed into the control maximum speed. Specifically, the system control unit 203 reads the value of the program maximum speed 402 described above with reference to FIG. 9 and writes the value into the control maximum speed 403. Then, the processing returns to step S1001, and the system control unit 203 repeats the processing procedure. In a case where the state of the tally lamp is not red tally-on (NO in step S1002), the processing proceeds to step S1004. In step S1004, the system control unit 203 checks whether the state of the tally lamp is on and green tally (green lamp is lit; hereinafter, such a state will be referred to as green tally-on). In a case where the state of the tally lamp is green tally-on (YES in step S1004), the processing proceeds to step S1005. In step S1005, the system control unit 203 writes the value of the preview maximum speed into the control maximum speed. Specifically, the system control unit 203 reads the value of the preview maximum speed 901 described above with reference to FIG. 9 and writes the value into the control maximum speed 403. Then, the processing returns to step S1001, and the system control unit 203 repeats the processing procedure. In a case where the state of the tally lamp is not green tally-on (NO in step S1004), the processing proceeds to step S1006. In step S1006, the system control unit 203 writes the value of the default maximum speed into the control maximum speed. Specifically, the system control unit 203 reads the value of the default maximum speed 401 described above with reference to FIG. 9 and writes the value into the control maximum speed 403. Then, the processing returns to step S1001, and the system control unit 203 repeats the processing procedure.

As described above, in the present exemplary embodiment, a change in color is checked as well as whether the tally lamp is turned on. Accordingly, the pan and tilt maximum speeds can be changed between on-program (during video distribution), during a preview, and at default time (in a state other than on-program or during a preview). Alternatively, instead of checking the state of the tally lamp (whether the tally lamp is turned on and the light color), the system control unit 203 may directly determine the state of the own camera (on-program, during a preview, or other states) from the type of control command (first tally information or second tally information) received by the communication unit 211. Specifically, in a case where the communication unit 211 receives the control command (first tally information) indicating on-program (that video distribution is in progress) from the camera controller 130, the system control unit 203 determines that the own camera is on-program. In a case where the communication unit 211 receives the control command (second tally information) indicating a preview from the camera controller 130, the system control unit 203 determines that the own camera is being previewed. In a case where the communication unit 211 does not receive the first tally information or the second tally information from the camera controller 130, the system control unit 203 determines that the own camera is in a default state. Such a configuration enables speed control on the pan and tilt driving based on the state of the own camera even in a case where the camera does not include a tally lamp.

Figure 11:
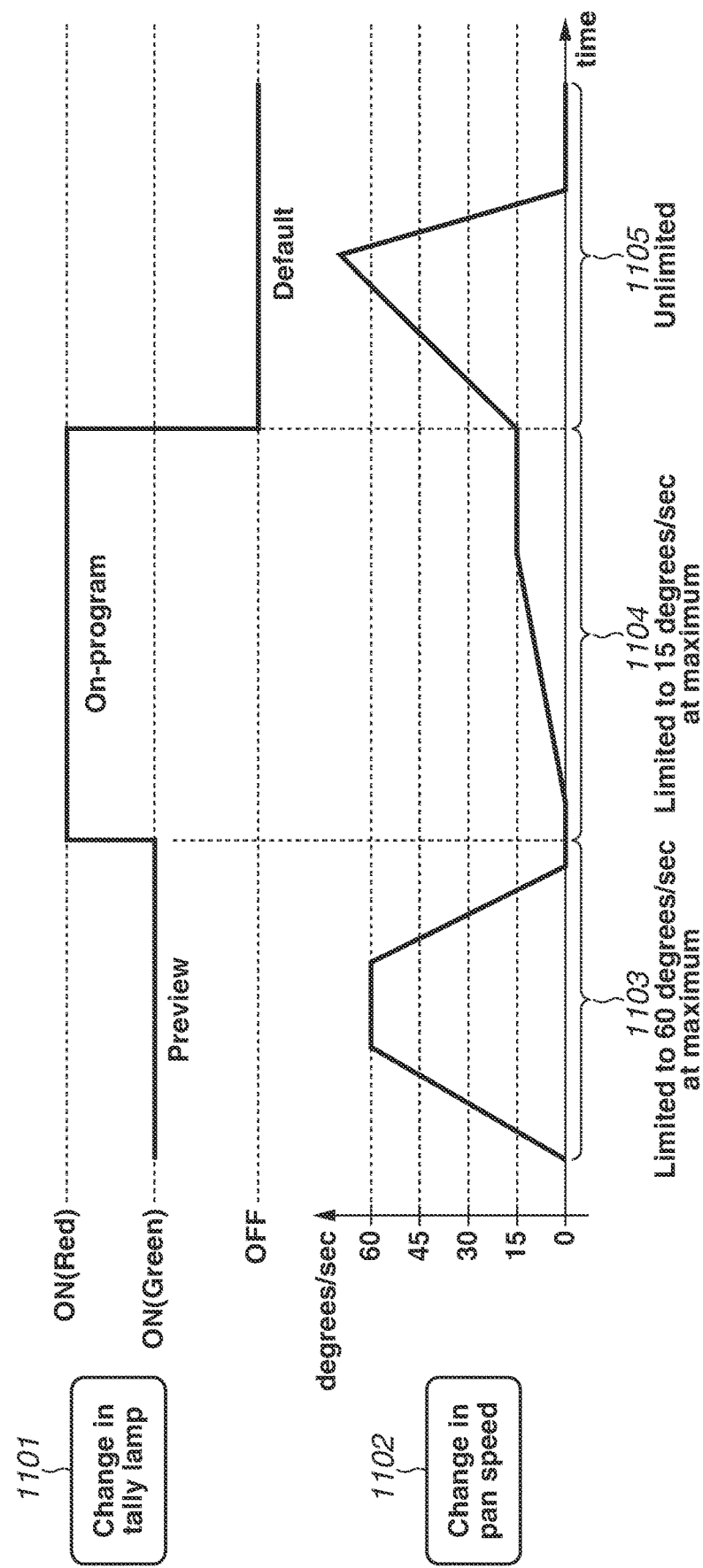
FIG. 11 is a time series graph illustrating the pan driving speed in a case where the control maximum speed changes due to changes in the tally state including the preview state according to one or more embodiment of the subject disclosure.

FIG. 11 is a time series graph illustrating a pan driving speed in a case where the control maximum speed changes due to changes in the tally state (video distribution state) including the preview state according to the present exemplary embodiment.

The time series graph of FIG. 11 includes two time series graphs, namely, one for a change in the tally lamp 1101 and one for a change in the pan speed 1102. Intervals 1103, 1104, and 1105 will be separately described.

In the interval 1103, the tally lamp is green tally-on. In a case where a pan operation is performed in the interval 1103, the pan speed increases only up to 60 degrees/sec since the preview maximum speed is applied to the control maximum speed. When the switcher unit of the camera controller 130 having the switcher function then switches and the video distribution state of the camera changes to on-program, the tally lamp turns to red tally-on and the interval 1104 starts.

In the interval 1104, the pan speed increases only up to 15 degrees/sec since the program maximum speed is applied to the control maximum speed. When the switcher unit of the camera controller 130 having the switcher function then switches and the video distribution state of the camera is neither on-program nor during a preview, the tally lamp turns off and the interval 1105 starts.

In the interval 1105, the default maximum speed is applied to the control maximum speed. With the speed limitation lifted, the pan speed increases based on the control command.

As can be seen from the time series graph, by the control according to the present exemplary embodiment having been described so far, the cameras 110 and 120 can be moved with a low upper limit applied to the pan and tilt speeds when the video distribution state of the cameras 110 and 120 is on-program, and with a moderate upper limit during a preview compared to on-program.

A third exemplary embodiment of the present disclosure will be described below with reference to FIGS. 12 to 16.

In the third exemplary embodiment of the present disclosure, a case where the processing for suppressing the pan and tilt speeds to a maximum speed is implemented not by the cameras 110 and 120 but by the camera controller 130 will mainly be described. In the first and second exemplary embodiments, the camera controller 130 transmits a pan or tilt instruction speed, and the cameras 110 and 120 receiving the instruction speed perform control to suppress the pan or tilt speed to the control maximum speed. In the present exemplary embodiment, the camera controller 130 suppresses the instruction speed to a maximum speed before transmitting the instruction speed.

Figure 12:
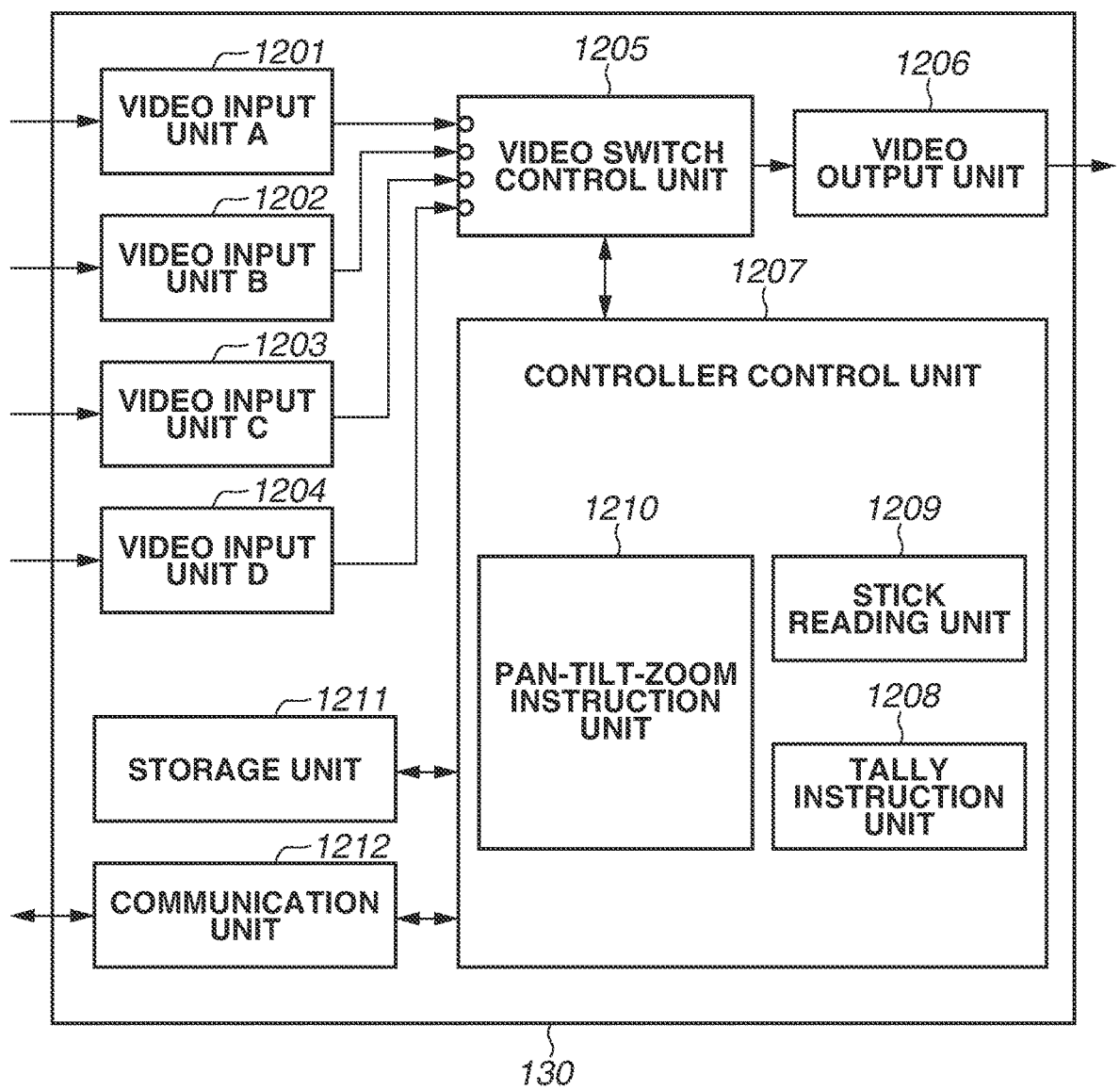
FIG. 12 is a functional configuration diagram of a camera controller having a switcher function according to one or more embodiment of the subject disclosure.

FIG. 12 illustrates a functional block diagram of the camera controller 130 having the switcher function according to the present exemplary embodiment.

The camera controller 130 having the switcher function includes, as a switcher function unit, the following components: a video input unit A 1201, a video input unit B 1202, a video input unit C 1203, a video input unit D 1204, a video switch control unit 1205, and a video output unit 1206. The camera controller 130 also includes, as a camera controller unit, the following components: a controller control unit 1207, a storage unit 1211, and a communication unit 1212. The controller control unit 1207 includes a tally instruction unit 1208, a stick reading unit 1209, and a pan-tilt-zoom instruction unit 1210 inside. The controller control unit 1207 further includes a not-illustrated button reading unit and a not-illustrated switch lever reading unit.

The video input units A, B, C, and D 1201, 1202, 1203, and 1204 input the video images of cameras connected to the respective video input terminals 131, and transmit the video images to the video switch control unit 1205 in the subsequent stage.

The video switch control unit 1205 transmits the video image of a camera selected by using the program selection buttons 132 to the video output unit 1206.

The video output unit 1206 outputs a video image compliant with the standard of the video output terminal 135, such as SDI.

The controller control unit 1207 includes one or more processors such as a CPU and an MPU. The controller control unit 1207 controls the entire camera controller 130 having the switcher function by executing a program stored in the storage unit 1211 to be described below. For example, the controller control unit 1207 performs processing for writing and storing settings about pan and tilt control into a not-illustrated area of the storage unit 1211. The controller control unit 1207 also reads the states of the control camera selection buttons 137, determines the camera to be controlled, and generates various control commands. The controller control unit 1207 passes the control commands to the communication unit 1212, whereby the control commands are transmitted to the camera to be controlled.

The tally instruction unit 1208 inquires the video switch control unit 1205 of the camera to be programmed selected by using the program selection buttons 132. The tally instruction unit 1208 then generates a control command (first tally information or second tally information) for tally control on the camera to be programmed. The tally instruction unit 1208 passes the control commands (first tally information and second tally information) to the communication unit 1212, whereby the control command (first tally information or second tally information) is transmitted to the camera to be programmed.

The stick reading unit 1209 is a processing unit for reading the state of the stick 138. The stick reading unit 1209 reads the direction, the amount of tilt, and the amount of axial rotation of the stick 138 from not-illustrated various sensors of the stick 138, and obtains digitally-converted values thereof.

The pan-tilt-zoom instruction unit 1210 performs processing for generating pan, tilt, and zoom control commands based on the values obtained from the foregoing stick reading unit 1209, and transmitting the control commands to the camera to be controlled.

The storage unit 1211 stores the program and setting values to be used by the controller control unit 1207, and is read and written by the controller control unit 1207. Storing the setting values in the storage unit 1211 enables restart using the previously set values.

The communication unit 1212 communicates with the cameras 110 and 120 to be controlled. The communication unit 1212 performs processing for transmitting communication data generated by the controller control unit 1207 from the control communication terminals 136, and receiving responses to instructions from the cameras 110 and 120 and passing the responses to the controller control unit 1207.

Figure 13:
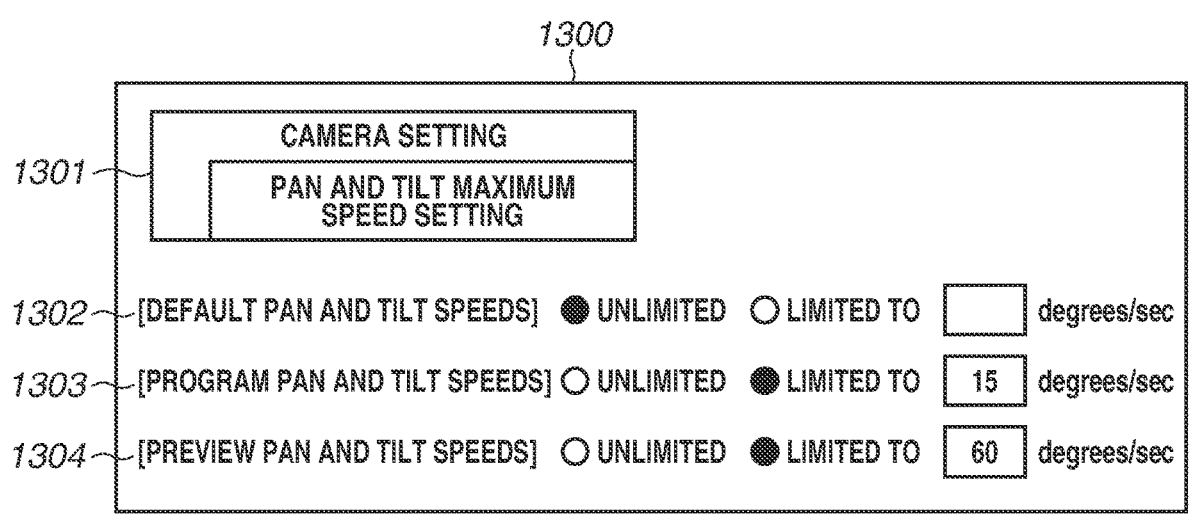
FIG. 13 is a diagram illustrating an example of a setting screen for setting pan and tilt maximum speeds into the camera controller having the switcher function according to one or more embodiment of the subject disclosure.

FIG. 13 illustrates an example of a setting screen for setting pan and tilt maximum speeds into the camera controller 130 having the switcher function according to the present exemplary embodiment. This setting screen is generated by a remote camera control unit of the camera controller 130 having the switcher function and output from the monitor output unit 139.

A pan and tilt maximum speed setting screen 1300 includes a setting title section 1301 and the following setting items: a default pan and tilt speed setting 1302, a program pan and tilt speed setting 1303, and a preview pan and tilt speed setting 1304.

The setting title section 1301 displays a title character string indicating controller-side pan and tilt maximum speed setting.

The default pan and tilt speed setting 1302 includes radio buttons for selecting whether to limit the pan and tilt speeds during normal operations other than on-program or during a preview. The default pan and tilt speed setting 1302 also includes a text box for inputting a maximum speed in the case of limiting the pan and tilt speeds.

The program pan and tilt speed setting 1303 includes radio buttons for selecting whether to limit the pan and tilt speeds when on-program. The program pan and tilt speed setting 1303 also includes a text box for inputting a maximum speed in the case of limiting the pan and tilt speeds.

The preview pan and tilt speed setting 1304 includes radio buttons for selecting whether to limit the pan and tilt speeds during a preview. The preview pan and tilt speed setting 1304 also includes a text box for inputting a maximum speed in the case of limiting the pan and tilt speeds.

Setting operations are performed using a not-illustrated keyboard connected to the camera controller 130 having the switcher function. In a case where the user performs a setting change by using the setting screen, the setting change is stored into a not-illustrated area of the storage unit 1211 of the camera controller 130 having the switcher function.

Figure 14:
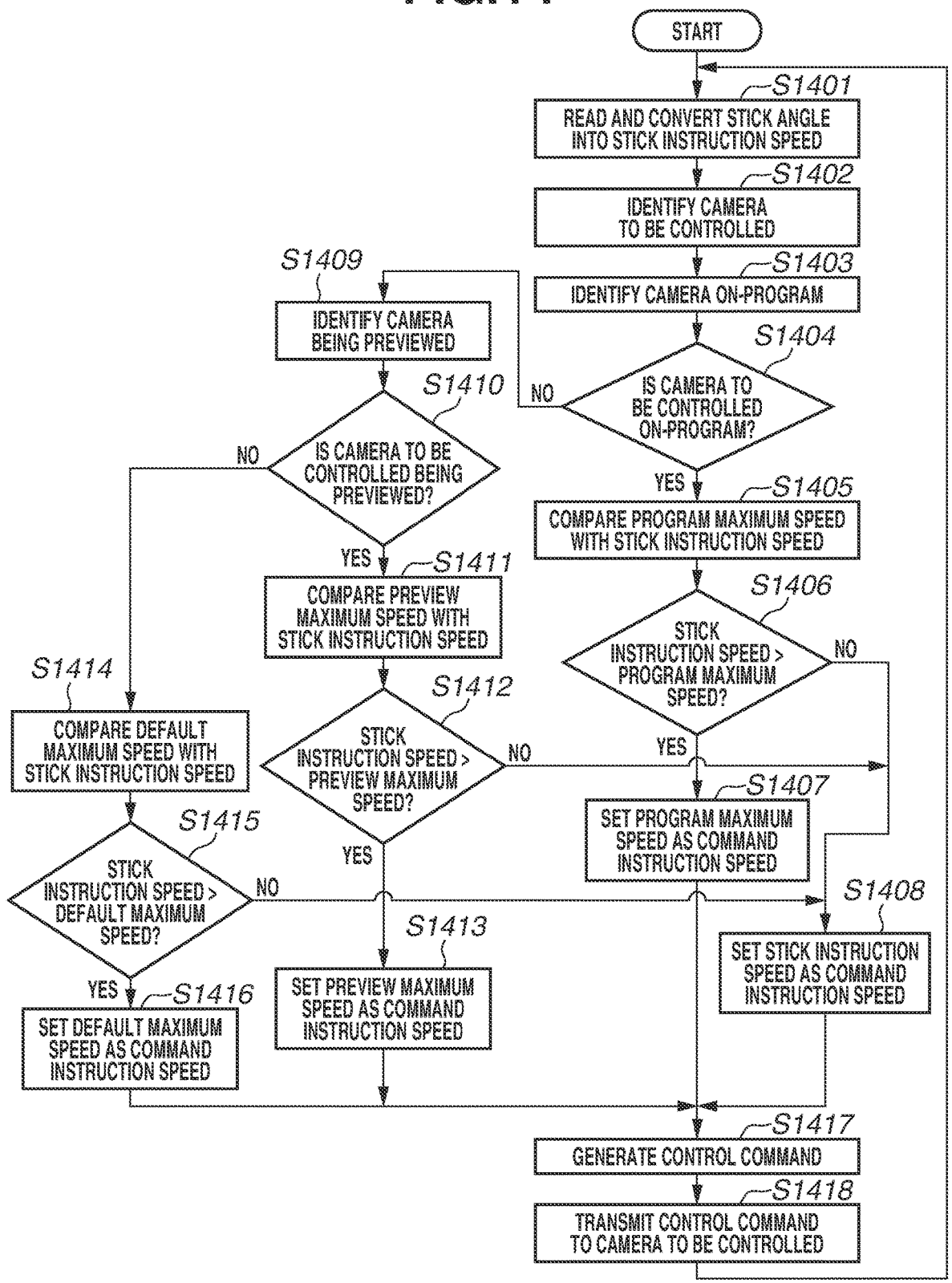
FIG. 14 is a flowchart illustrating a processing procedure for determining a command instruction speed for pan and tilt driving based on a change in the tally state and transmitting the command instruction speed according to one or more embodiment of the subject disclosure.

FIG. 14 is a flowchart illustrating a processing procedure for determining a pan or tilt instruction speed based on a change in the video distribution state, and transmitting the pan or tilt instruction speed. The processing of this flowchart is performed by the pan-tilt-zoom instruction unit 1210 included in the controller control unit 1207.

In step S1401, the angle of the stick 138 is read and converted into an instruction speed. As described above, the stick reading unit 1209 reads the angle of the stick 138. The pan-tilt-zoom instruction unit 1210 converts the tilt angle into an instruction speed (stick instruction speed).

In step S1402, the pan-tilt-zoom instruction unit 1210 obtains the number of one of the control camera selection buttons 137 that is selected and lit, and identifies the camera to be controlled.

In step S1403, the pan-tilt-zoom instruction unit 1210 obtains the number of one of the program selection buttons 132 that is selected and lit, and identifies the camera on-program.

In step S1404, the pan-tilt-zoom instruction unit 1210 compares the number of the camera to be controlled obtained in step S1402 with the number of the camera on-program obtained in step S1403, and checks whether the camera to be controlled is on-program based on whether the two numbers coincide. In a case where the camera to be controlled is on-program (YES in step S1404), the processing proceeds to step S1405. In step S1405, the pan-tilt-zoom instruction unit 1210 compares the value of the program maximum speed with that of the stick instruction speed obtained in step S1401. In step S1406, in a case where the stick instruction speed exceeds the program maximum speed (YES in step S1406), the processing proceeds to step S1407. In step S1407, the pan-tilt-zoom instruction unit 1210 sets the program maximum speed as a command instruction speed. In step S1417, the pan-tilt-zoom instruction unit 1210 generates a control command. In step S1406, in a case where the stick instruction speed does not exceed the program maximum speed (NO in step S1406), the processing proceeds to step S1408. In step S1408, the pan-tilt-zoom instruction unit 1210 sets the stick instruction speed as the command instruction speed. In step S1417, the pan-tilt-zoom instruction unit 1210 generates a control command.

In step S1404, in a case where the camera to be controlled is not on-program (NO in step S1404), the processing proceeds to step S1409. In step S1409, the pan-tilt-zoom instruction unit 1210 refers to the preview selection buttons 133, obtains the number of one of the preview selection buttons 133 that is selected and lit, and identifies the camera being previewed.

In step S1410, the pan-tilt-zoom instruction unit 1210 compares the number of the camera to be controlled obtained in step S1402 with the number of the camera being previewed obtained in step S1409, and checks whether the camera to be controlled is being previewed based on whether the two numbers coincide. In a case where the camera to be controlled is being previewed (YES in step S1410), the processing proceeds to step S1411. In step S1411, the pan-tilt-zoom instruction unit 1210 compares the value of the preview maximum speed with that of the stick instruction speed obtained in step S1401. In step S1412, in a case where the stick instruction speed exceeds the preview maximum speed (YES in step S1412), the processing proceeds to step S1413. In step S1413, the pan-tilt-zoom instruction unit 1210 sets the preview maximum speed as the command instruction speed. In step S1417, the pan-tilt-zoom instruction unit 1210 generates a control command. In step S1412, in a case where the stick instruction speed does not exceed the preview maximum speed (NO in step S1412), the processing proceeds to step S1408. In step S1408, the pan-tilt-zoom instruction unit 1210 sets the stick instruction speed as the command instruction speed. In step S1417, the pan-tilt-zoom instruction unit 1210 generates a control command.

In step S1410, in a case where the camera to be controlled is not being previewed (NO in step S1410), the processing proceeds to step S1414. In step S1414, the pan-tilt-zoom instruction unit 1210 compares the value of the default maximum speed with that of the stick instruction speed obtained in step S1401. In step S1415, in a case where the stick instruction speed exceeds the default maximum speed (YES in step S1415), the processing proceeds to step S1416. In step S1416, the pan-tilt-zoom instruction unit 1210 sets the default maximum speed as the command instruction speed. In step S1417, the pan-tilt-zoom instruction unit 1210 generates a control command. In step S1415, in a case where the stick instruction speed does not exceed the default maximum speed (NO in step S1415), the processing proceeds to step S1408. In step S1408, the pan-tilt-zoom instruction unit 1210 sets the stick instruction speed as the command instruction speed. In step S1417, the pan-tilt-zoom instruction unit 1210 generates a control command.

In step S1418, the pan-tilt-zoom instruction unit 1210 passes the control command generated in step S1417 to the communication unit 1212, whereby the control command is transmitted to the camera to be controlled. Then, the processing returns to step S1401, and the pan-tilt-zoom instruction unit 1210 repeats the processing of the flowchart.

By the above described procedure, the camera controller 130 can generate a control command and transmit an instruction for a speed suppressed to or below various maximum speeds to the camera to be controlled based on the video distribution state of the camera to be controlled.

Figure 15:
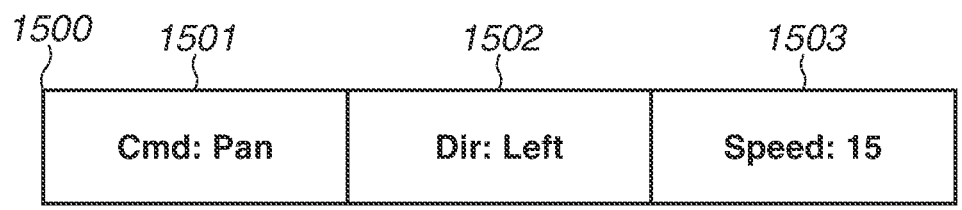
FIG. 15 is a diagram illustrating an example of a control command that the camera controller having the switcher function according to one or more embodiment of the subject disclosure.

FIG. 15 illustrates an example of a control command that the camera controller 130 having the switcher function transmits to a camera. As described above with reference to FIG. 14, the control command is generated for pan-tilt-zoom control by the pan-tilt-zoom instruction unit 1210, based on the value obtained from the stick reading unit 1209 and the video distribution state of the camera to be controlled.

A control command 1500 includes data including a command type 1501, a direction parameter 1502, and a speed parameter 1503.

A value indicating whether a control type is pan control, tilt control, or zoom control is set into the command type 1501. Specifically, "Pan" is set for pan control, "Tilt" for tilt control, and "Zoom" for zoom control.

A value indicating a direction corresponding to the command type 1501 is set into the direction parameter 1502. For example, in the case of pan control, either "Left" or "Right" is set. In the case of tilt control, either "Up" or "Down" is set.

An instruction speed corresponding to the command type 1501 is set into the speed parameter 1503. For example, in a case where the instruction speed is 15 degrees/sec, a value of 15 is set. This instruction speed refers to the command instruction speed suppressed to or below various maximum speeds based on the video distribution state of the camera to be controlled by the processing of the flowchart in FIG. 14 described above.

Transmission of such a control command to the camera to be controlled enables the camera to perform the instructed control based on the control command.

Figure 16:
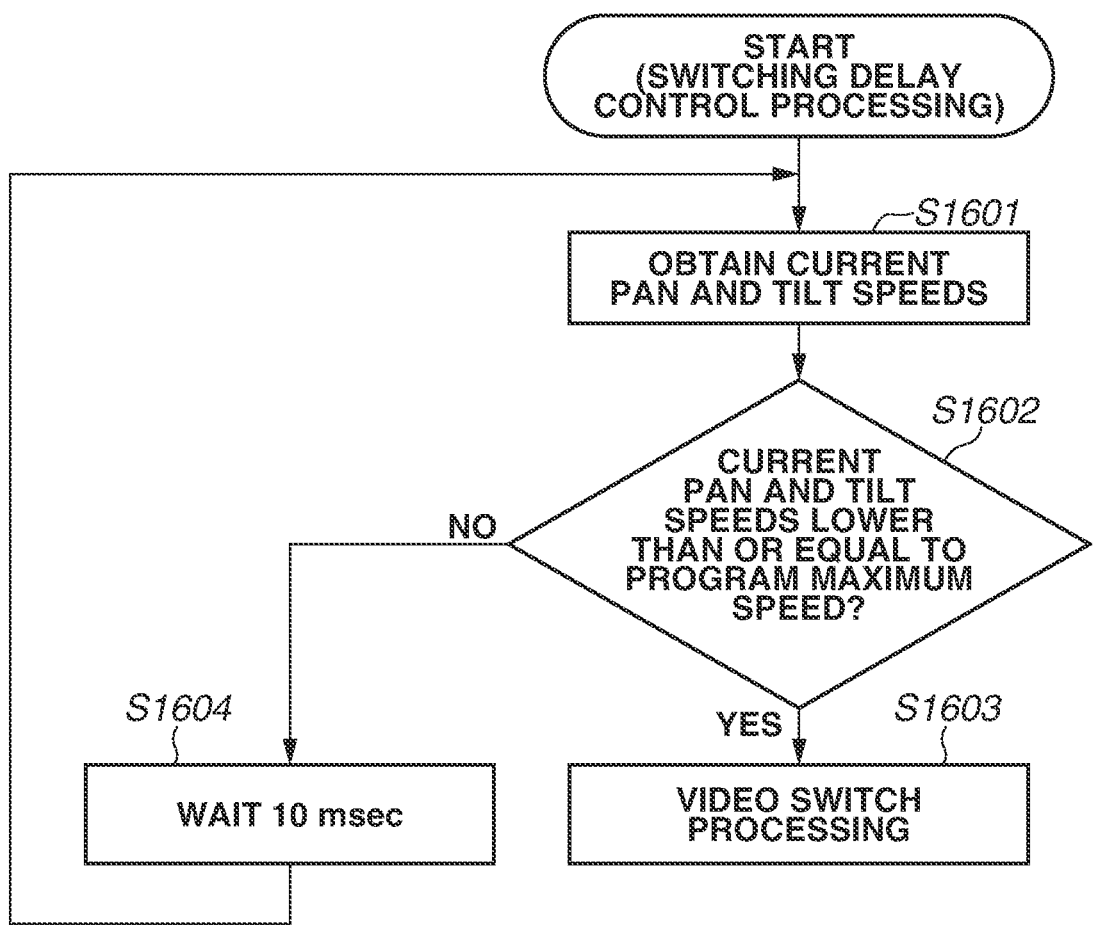
FIG. 16 is a flowchart illustrating switching delay control processing when video images are switched by a switch lever according to one or more embodiment of the subject disclosure.

FIG. 16 is a flowchart illustrating switching delay control processing for a case where the camera to be switched to on-program is performing a pan operation or tilt operation when the switch lever 134 is operated to switch video images.

The switching delay control processing of the flowchart is performed by the controller control unit 1207.

When a switching operation is performed by the switch lever 134, then in step S1601, the controller control unit 1207 initially obtains the current pan and tilt speeds from the camera to be controlled. Specifically, the controller control unit 1207 passes a not-illustrated control command for inquiring of the current driving speeds to the communication unit 1212, whereby the control command is transmitted to the camera to be controlled. As a response, the controller control unit 1207 receives and obtains the current pan and tilt speeds from the camera to be controlled. In other words, the controller control unit 1207 functions as a speed obtaining unit.

In step S1602, the controller control unit 1207 checks whether the current pan and tilt speeds are lower than or equal to the program maximum speed. In a case where both the current pan and tilt speeds obtained in step S1601 are lower than or equal to the program maximum speed (YES in step S1602), the processing proceeds to step S1603. In step S1603, the controller control unit 1207 instructs the video switch control unit 1205 to immediately perform video switching processing, and the processing ends. Meanwhile, in a case where at least either one of the current pan and tilt speeds exceeds the program maximum speed (NO in step S1602), the processing proceeds to step S1604. In step S1604, the controller control unit 1207 waits a certain time. Specifically, for example, the controller control unit 1207 waits 10 msec before the processing returns to step S1601. Such a loop is repeated until both the current pan and tilt speeds fall to or below the program maximum speed. In this processing, the controller control unit 1207 functions as an image switching unit.

As described above, in the present exemplary embodiment, in a case where the driving speeds obtained by the speed obtaining unit are higher than the program maximum speed (maximum value), the image switching unit switches the video image for distribution after a lapse of a predetermined time. This can delay the switching of the video images until the driving speeds falls to or below the program maximum speed. The video images can thus be switched after the driving speeds are reduced to an easy-to-view speed.

While the exemplary embodiments of the present disclosure have been described above, the present disclosure is not limited to such exemplary embodiments. Various changes and modifications may be made without departing from the gist of the present disclosure.

Part or all of control according to an exemplary embodiment of the present disclosure may be implemented by supplying a computer program (software) for implementing the functions of the foregoing exemplary embodiments to an image capturing apparatus or an information processing apparatus via a network or various storage media. The program may be read and executed by a computer (or CPU or MPU) of the image capturing apparatus or information processing apparatus. In such a case, the program and the storage media storing the program constitute exemplary embodiments of the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-151403, filed Aug. 21, 2019, which is hereby incorporated by reference in its entirety.

What is claimed is:

1. An image capturing apparatus capable of capturing an image, the image capturing apparatus comprising:
a driving mechanism configured to change an image capturing direction of the image capturing apparatus; and
a computer executing instructions that, when executed by the computer, causes the computer to function as:
a control unit configured to control the driving mechanism; and
a reception unit configured to receive first tally information from another apparatus,
wherein the control unit is configured to control, in a case where the reception unit does not receive the first tally information, the driving mechanism to set a maximum speed of the driving mechanism at a first driving speed, and control, in a case where the reception unit receives the first tally information, the driving mechanism to set the maximum speed at a second driving speed lower than the first driving speed.

2. The image capturing apparatus according to claim 1, wherein the reception unit is configured to receive second tally information different from the first tally information from another apparatus, and
wherein the control unit is configured to control, in a case where the reception unit receives the second tally information, the driving mechanism to set the maximum speed of the driving mechanism at a third driving speed between the first driving speed and the second driving speed.

3. The image capturing apparatus according to claim 2, further comprising a display device configured to perform display corresponding to the first tally information.

4. The image capturing apparatus according to claim 3, wherein the display device configured to perform display corresponding to the second tally information.

5. The image capturing apparatus according to claim 2, wherein the second tally information indicates that the image capturing apparatus is a candidate camera to be used for distribution of the image or recoding of the image.

6. The image capturing apparatus according to claim 1, wherein the first tally information indicates that the image capturing apparatus is on progress of distribution of the image or on progress of recoding of the image.

7. A method for controlling an image capturing apparatus, the method comprising:
    driving a driving mechanism for changing an image capturing direction of the image capturing apparatus;
    controlling the driving mechanism; and
    receiving first tally information from another apparatus,
    wherein the controlling includes, in a case where the first tally information is not received, controlling the driving mechanism to set a maximum speed of the driving mechanism at a first driving speed, and in a case where the first tally information is received, controlling the driving mechanism to set the maximum speed of the driving mechanism at a second driving speed lower than the first driving speed.

8. The method according to claim 7,
    wherein the receiving includes receiving second tally information different from the first tally information from another apparatus, and
    wherein the controlling includes controlling, in a case where the second tally information is received, the driving mechanism to set the maximum speed of the driving mechanism at a third driving speed between the first driving speed and the second driving speed.

9. The method according to claim 8,
    wherein the second tally information indicates that the image capturing apparatus is a candidate camera to be used for distribution of the image or recoding of the image.

10. The method according to claim 7,
    wherein the first tally information indicates that the image capturing apparatus is on progress of distribution of the image or on progress of recoding of the image.

11. A non-transitory computer-readable storage medium storing a program for causing a computer to execute a method for controlling an image capturing apparatus, the method comprising:
    driving a driving mechanism for changing an image capturing direction of the image capturing apparatus;
    controlling the driving mechanism; and
    receiving first tally information from another apparatus,
    wherein the controlling includes, in a case where the first tally information is not received, controlling the driving mechanism to set a maximum speed of the driving mechanism at a first driving speed, and in a case where the first tally information is received, controlling the driving mechanism to set the maximum speed of the driving mechanism at a second driving speed lower than the first driving speed.

12. A control apparatus comprising a computer executing instructions that, when executed by the computer, causes the computer to function as:
    an operation unit configured to change an image capturing direction of an image capturing apparatus;
    a transmission unit configured to transmit a driving signal to the image capturing apparatus based on an operation of the operation unit; and
    a determination unit configured to determine whether a state of the image capturing apparatus is a first tally state,
    wherein the transmission unit is configured to transmit, in a case where the determination unit does not determine that the state of the image capturing apparatus is the first tally state, the driving signal to set a maximum speed at a first driving speed, and transmit, in a case where the determination unit determines that the state of the image capturing apparatus is the first tally state, the driving signal to set the maximum speed at a second driving speed lower than the first driving speed.

13. The control apparatus according to claim 12, wherein the transmission unit is configured to transmit, in a case where the determination unit determines that the state of the image capturing apparatus is a second tally state different from the first tally state, the driving signal to set the maximum speed at a third driving speed between the first driving speed and the second driving speed.

14. The control apparatus according to claim 13,
    wherein the second tally state corresponds to state where the image capturing apparatus is a candidate camera to be used for distribution of an image or recoding of the image.

15. The control apparatus according to claim 12, wherein the instructions further causes the computer to function as:
    a speed obtaining unit configured to obtain a current driving speed of the image capturing apparatus; and
    a decision unit configured to decide to distribute or record an image captured by the image capturing apparatus,
    wherein, in a case where the determination unit determines that the state of the image capturing apparatus is the first tally state and the driving speed obtained by the speed obtaining unit is higher than the second driving speed, the decision unit is configured to decide that distributing or recording of the image captured by the image capturing apparatus is performed after a lapse of a predetermined time.

16. The control capturing apparatus according to claim 12,
    wherein the first tally state corresponds to state where the image capturing apparatus is on progress of distribution of an image or on progress of recoding of the image.

17. A method comprising:
    performing an operation to change an image capturing direction of an image capturing apparatus;
    transmitting a driving signal to the image capturing apparatus based on the operation; and
    determining whether a state of the image capturing apparatus is a first tally state,
    wherein the transmitting includes transmitting, in a case where the state of the image capturing apparatus is not determined to be the first tally state, the driving signal to set a maximum speed at a first driving speed, and transmitting, in a case where the state of the image capturing apparatus is determined to be the first tally state, the driving signal to set the maximum speed at a second driving speed lower than the first driving speed.

18. The method according to claim 17, wherein the transmitting includes transmitting, in a case where the state of the image capturing apparatus is determined to be a second tally state different from the first tally state, the driving signal to set the maximum speed of the driving at a third driving speed between the first driving speed and the second driving speed.

19. The method according to claim 18,
wherein the second tally state corresponds to state where the image capturing apparatus is a candidate camera to be used for distribution of an image or recoding of the image.

20. The method according to claim 17, further comprising:
obtaining a current driving speed of the image capturing apparatus; and
deciding to distribute or record an image captured by the image capturing apparatus,
wherein, in a case where the state of the image capturing apparatus is determined to be the first tally state and the driving speed obtained by the obtaining is higher than the second driving speed, the deciding includes deciding that distributing or recording the image captured by the image capturing apparatus is performed after a lapse of a predetermined time.

21. The method according to claim 17,
wherein the first tally state corresponds to state where the image capturing apparatus is on progress of distribution of an image or on progress of recoding of the image.

22. A non-transitory computer-readable storage medium storing a program for causing a computer to execute a method comprising:
performing an operation to change an image capturing direction of an image capturing apparatus;
transmitting a driving signal to the image capturing apparatus based on the operation; and
determining whether a state of the image capturing apparatus is a first tally state,
wherein the transmitting includes transmitting, in a case where the state of the image capturing apparatus is not determined to be the first tally state, the driving signal to set a maximum speed at a first driving speed, and transmitting, in a case where the state of the image capturing apparatus is determined to be the first tally state, the driving signal to set the maximum speed at a second driving speed lower than the first driving speed.

* * * * *